United States Patent [19]

Kyle

[11] 4,425,476

[45] Jan. 10, 1984

[54] PROGRESSIVELY FUSED CERAMIC SEALS BETWEEN SPACED MEMBERS SUCH AS A TERMINAL PIN AND A FERRULE

[76] Inventor: James C. Kyle, 24372 Via San Clemente, Mission Viejo, Calif. 92692

[21] Appl. No.: 251,512

[22] Filed: Apr. 6, 1981

[51] Int. Cl.3 ...................... H01B 17/26; C03C 27/02; C03C 3/22

[52] U.S. Cl. ........................... 174/152 GM; 65/59.34; 65/59.35; 403/29; 403/30; 403/179

[58] Field of Search .................... 174/50.61, 152 GM; 65/59.1, 59.21, 59.22, 59.24, 59.25, 59.27, 59.3, 59.31, 59.34, 59.35, 59.4, 59.5, 59.6; 403/28, 29, 30, 179

[56] References Cited

U.S. PATENT DOCUMENTS

| | | | |
|---|---|---|---|
| 1,558,524 | 10/1925 | Winninghoff | 403/29 |
| 1,562,533 | 11/1925 | Weintrub | 174/152 GM X |
| 2,100,187 | 11/1937 | Handrek | 174/152 GM X |
| 2,517,019 | 8/1950 | Nordberg | 403/29 |
| 4,282,395 | 8/1981 | Hagemann | 403/29 X |

FOREIGN PATENT DOCUMENTS

| | | | |
|---|---|---|---|
| 798663 | 7/1958 | United Kingdom | 174/152 GM |

*Primary Examiner*—Laramie E. Askin

*Attorney, Agent, or Firm*—Ellsworth R. Roston; Charles H. Schwartz

[57] ABSTRACT

A ferrule is provided with an opening extending through the ferrule and a terminal pin is disposed in the opening in spaced relationship to the ferrule. A plurality of insulating members are disposed on the terminal pin in the opening in a stacked relationship. Each of the insulating members is fused to the terminal pin and the ferrule. Each of the insulating members in the stack has a higher temperature of fusion than the preceding members in the stack. The insulating members in the stack are progressively fused to the ferrule and the terminal pin by the application of progressive temperatures to the terminal pin, the ferrule and the insulating members.

The insulating members having the highest temperature of fusion are provided with properties of being able to withstand large forces without any degradation of the fusion with the terminal pin and the ferrule. The insulating members of the reduced temperatures of fusion are able to withstand other types of shock such as sudden changes in temperature.

The terminal pin extends through the ferrule to a position external to the ferrule. An additional insulating member is disposed on the ferrule in hermetically sealed relationship with the terminal pin and the ferrule at the external position.

23 Claims, 3 Drawing Figures

PERCENTAGE IN MIXTURE

| MATERIAL | MEMBER 24 | MEMBER 26 | MEMBER 28 | MEMBER 30 | MEMBER 32 | MEMBER 34 | MEMBER 36 |
|---|---|---|---|---|---|---|---|
| LEAD OXIDE | 57.4 | 61.4 | 64.9 | 68.0 | 71.0 | 73.6 | 76.0 |
| SILICON DIOXIDE | 31.9 | 27.9 | 25.4 | 23.1 | 21.0 | 19.1 | 17.4 |
| ZIRCONIUM OXIDE | 3.7 | 3.7 | 3.3 | 3.0 | 2.7 | 2.5 | 2.2 |
| TITANIUM OXIDE | 3.9 | 3.9 | 3.5 | 3.2 | 2.9 | 2.6 | 2.4 |
| BORIC ACID | 2.6 | 2.6 | 2.4 | 2.2 | 2.0 | 1.8 | 1.6 |
| SODIUM CARBONATE | 0.5 | 0.5 | 0.5 | 0.5 | 0.4 | 0.4 | 0.4 |
| SMELTING TEMPERATURE | 1950°F | 1900°F | 1850°F | 1800°F | 1750°F | 1700°F | 1650°F |
| FUSING TEMPERATURE | 1550°F | 1500°F | 1450°F | 1400°F | 1350°F | 1300°F | 1250°F |

FIG. 3

PROGRESSIVELY FUSED CERAMIC SEALS BETWEEN SPACED MEMBERS SUCH AS A TERMINAL PIN AND A FERRULE

This invention relates to a terminal assembly providing a hermetic seal between a terminal pin and a ferrule and more particularly relates to a terminal assembly which is capable of withstanding large forces without any degradation in the hermetic seal. The invention also relates to a terminal assembly which is capable of withstanding suddent changes in other parameters such as temperature without any degradation in the hermetic seals. The invention further relates to methods of producing such terminal assemblies.

Terminal assemblies including a ferrule and a terminal pin are in widespread use. In many of such terminal assemblies, the ferrule is provided with a hole which extends through the ferrule, and the terminal pin is disposed in the opening in spaced relationship to the ferrule. An insulating member is disposed in the opening in sealed relationship to the ferrule and the terminal pin.

In a number of applications, the terminal assemblies have to be capable of withstanding very high forces without any degradation of the seal in the assembly. The terminal assembly also has to be able to withstand sudden changes in other parameters such as temperature without any degradation of the seal.

A considerable effort has been devoted over an extended number of years to provide a terminal assembly which meets the specifications described in the previous paragraph. The effort has been particularly pronounced in recent years because such terminal assemblies are needed for such topical industries as the recovery and production of energy. For example, such terminal assemblies have utility in oil wells. In spite of such considerable effort, a satisfactory resolution of the problem has not yet been effectuated.

This invention provides a terminal assembly which overcomes the difficulties discussed in the previous paragraphs. The terminal assembly of this invention provides a ferrule and a terminal pin in hermetically sealed relationship. The terminal assembly is capable of withstanding very high forces without any degradation in the hermetic seal. The terminal assembly is also able to withstand sudden changes in such parameters as temperatures without any degradation in the hermetic seal.

In one embodiment of the invention, a ferrule is provided with an opening extending through the ferrule and a terminal pin is disposed in the opening in spaced relationship to the ferrule. A plurality of insulating members are disposed on the terminal pin in the opening in a stacked relationship. Each of the insulating members is fused to the terminal pin and the ferrule. Each of the insulating members in the stack has a higher temperature of fusion than the preceding members in the stack. The insulating members in the stack are progressively fused to the ferrule and the terminal pin by the application of progressive temperatures to the terminal pin, the ferrule and the insulating members.

The insulating members having the highest temperature of fusion are provided with properties of being able to withstand large forces without any degradation of the fusion with the terminal pin and the ferrule. The insulating members of the reduced temperatures of fusion are able to withstand other types of shock such as sudden changes in temperature.

The terminal pin extends through the ferrule to a position external to the ferrule. An additional insulating member is disposed on the ferrule in hermetically sealed relationship with the terminal pin and the ferrule at the external position.

In the drawings

FIG. 3 is a table showing the composition and various parameters of a plurality of related insulating members in the termianl assembly of this invention.

Figure 1:
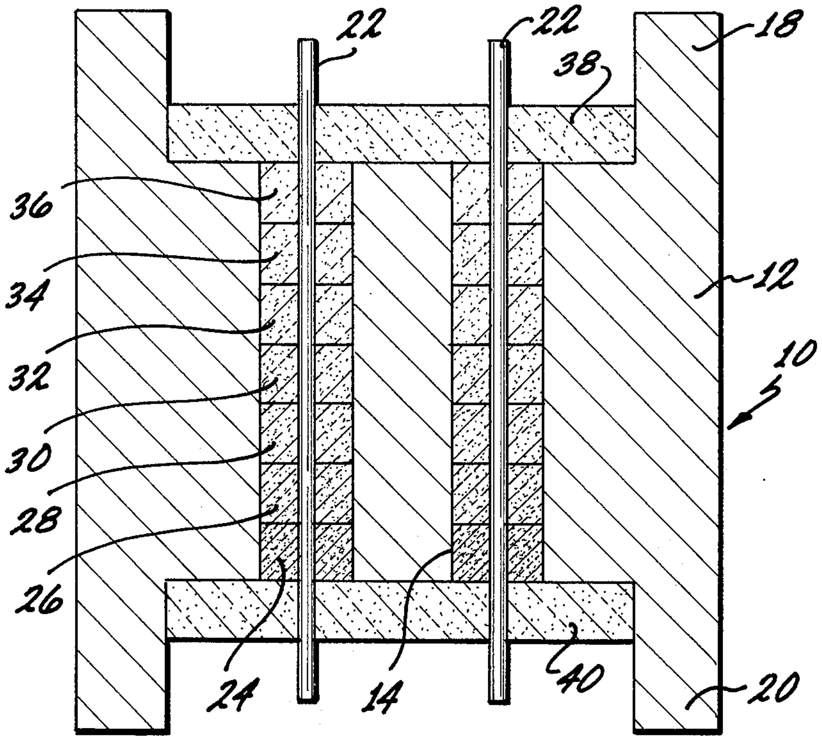
FIG. 1 is a sectional view of a terminal assembly constituting one embodiment of the invention.

In one embodiment of the invention, a terminal assembly generally indicated at 10 is provided. The terminal assembly 10 includes a ferrule 12 made from a suitable material such as Inconel or stainless steel. Inconel includes such metals as nickel, iron, cobalt, vanadium and chromium. The ferrule 12 is provided with openings 14 which extend through the ferrule. The ferrule 12 has flanges 18 and 20 at opposite extremities of the ferrule.

Terminal pins 22 extend through the openings 14 in the ferrule to positions external to the ferrule at their opposite ends. The terminal pins 22 are disposed in spaced relationship to the ferrule 12 in their extension through the openings 14. The terminal pins 22 may be made form Inconel or stainless steel.

Insulating members 24, 26, 28, 30, 32, 34 and 36 are disposed in stacked relationship on the terminal pin 22 in one of the openings 14 and are hermetically sealed to the terminal pin and the ferrule 12. Although seven (7) insulating members are shown and described, it will be appreciated that any number of insulating members in a plurality may be used. It will also be appreciated that similar arrangements may be provided for the other terminal pins 22.

Each of the insulating members 24, 26, 28, 30, 32, 34 and 36 has a different temperature of fusion to the terminal pin 22 and the ferrule 12 than the other insulating members in the plurality. Preferably the highest temperature of fusion occurs in the insulating member 24 and progressively decreased temperatures of fusion occur in the members 26, 28, 30, 32, 34 and 36. The temperatures of fusion of the members 24, 26, 28, 30, 32, 34 and 36 may be respectively in the order of 1550° F., 1500° F., 1450° F., 1400° F., 1350° F., 1300° F. and 1250° F.

The insulating members 24, 26, 28, 30, 32, 34 and 36 are primarily polycrystalline and relatively non-viscous. The members 24, 26, 28, 30, 32, 34 and 36 are able to withstand relatively high forces such as tensile pulls of fifty pounds (50 lbs.) on the terminal pin 22 without any degradation of the hermetic seals between the insulating members and the terminal pin 22 or between the insulating members and the ferrule 12.

The insulating members 24, 26, 28, 30, 32, 34 and 36 are able to provide electrical resistivities as high as ten thousand megohms ($10^{10}$ ohms) when subjected to direct potentials as high as five hundred volts (500 V.) DC. The insulating material is able to provide such electrical resistivities even after being subjected to live steam at a temperature of 212° F. in a confined space for a period as long as three (3) days and thereafter being blow dried for a period as short as thirty (30) seconds.

The members 24, 26, 28, 30, 32, 34 and 36 are progressively fused as the temperature of the terminal assembly is increased from a temperature of approximately 1250°

F. to a temperature of approximately 1550° F. As each of the members 24, 26, 28, 30, 32, 34 and 36 becomes fused to the ferrule 12 and the terminal pin 22, air escapes downwardly through the remaining ones of the members that are still unfused. In this way, the members are fused to the ferrule 12 and the terminal pin 22 without the production of any air pockets.

As each of the insulating members 24, 26, 28, 30, 32, 34 and 36 becomes heated, the outer periphery of each of the insulating members tends to become molten before the interior portion of the member. This causes each of the insulating members to assume a somewhat dome-shaped configuration. This increases the length of the electrical leakage path between the terminal pin 22 and the ferrule 12.

A member 38 made from a suitable insulating material is hermetically sealed to the terminal pins 22 and the top surface of the ferrule 12 and to the flanges 18 of the ferrule. In like manner, a member 40 made from substantially the suitable insulating material as the member 38 is hermetically sealed to the terminal pin 22 and the bottom surface of the ferrule 12 and to the flanges 20 of the ferrule.

The members 38 and 40 are provided with a fusing temperature less than that of any of the members 24, 26, 28, 30, 32, 34 and 36. The member 38 is provided with a slightly higher fusing temperature than the member 40. This is obtained by forming the member 40 from substantially the same materials as the member 38 but in slightly different proportions than the materials in the member 38. The members 38 and 40 are advantageous because they significantly increase the length of the electrical leakage path between the terminal pins and the ferrule and accordingly increase significantly the electrical resistivity of the terminal assembly. The members 38 and 40 are further advantageous because they provide external seals for the terminal assembly.

The composition and method of forming the insulating members such as the member 24 are fully disclosed in co-pending application Ser. No. 214,256 filed by me on Dec. 8, 1980, now U.S. Pat. No. 4,371,588. The insulating members 24, 26, 28, 30, 32, 34 and 36 may have the following composition:

| Material | Range of Percentages by Weight |
|---|---|
| Lead oxide (red lead) | 57-68 |
| Silicon dioxide | 23-32 |
| Soda ash (sodium carbonate) | 0.4-0.6 |
| Titanium dioxide | 3.2-3.9 |
| Zirconium oxide | 3.0-3.7 |
| Boric acid | 2.2-2.6 |

As is well known, silicon dioxide is a common material in glasses and ceramics. Lead oxide provides a considerable control over the melting temperature of the insulating members 24, 26, 28, 30, 32, 34 and 36 and also provides a considerable control over the characteristics of the coefficient of thermal expansion of the insulating material. The lead oxide also controls the electrical resistivity of the insulating members 24, 26, 28, 30, 32, 34 and 36. The relative percentages of the silicon dioxide and the lead oxide in the insulating members tend to control the coefficient of thermal expansion of the material so that the changes in the coefficient of the thermal expansion of the members are matched to those of the terminal pin and the ferrule 12. The matching of such changes in the coefficients of thermal expansion is particularly enhanced because of the relatively high ratio of red lead to silicon dioxide in the insulating members 24, 26, 28, 30, 32, 34 and 36.

Boric oxide acts as a glass former. It facilitates the production of at least a partially amorphous state in the insulating members 24, 26, 28, 30, 32, 34 and 36. Sodium carbonate is also a glass former. Since it is actually a powerful glass former, the relatively small amount of soda ash in the insulating members 24, 26, 28, 30, 32, 34 and 36 has a greater effect than the low percentage would indicate. Soda ash is especially helpful in providing the insulating members 24, 26, 28, 30, 34 and 36 with substantially the same changes in the coefficient of thermal expansion as each of the ferrule 12 and the terminal pin 22 when these members are made from titanium. Zirconium oxide and titanium dioxide are crystallites and insure that the insulating material is at least partially crystalline.

The insulating material may be formed by mixing the different materials in the particular ranges specified above and heating the mixture to a suitable temperature such as a temperature shown in FIG. 3 for each of the members 24, 26, 28, 30, 32, 34 and 36. The mixture may then be maintained at this temperature for a suitable period of time such as a period to approximately three (3) hours. The material may then be quenched in a suitable liquid such as water and then ground and formed into beads.

The insulating members 24, 26, 28, 30, 32, 34 and 36 produced after the quenching operation are partially amorphous and partially polycrystalline. The relative proportions of the insulating members 24, 26, 28, 30, 32, 34 and 36 in the amorphous and polycrystalline states are somewhat independent of the temperatures and periods of time in which the mixture for each member is heated. This is particularly true since the mixture tends to become partially amorphous and partially polycrystalline at the time that the mixture melts. As a result, the mixture may be melted repetitively without affecting significantly the properties of the material.

When the members 24, 26, 28, 30, 32, 34 and 36 are to be sealed to the members 12 and 22, the beads of the insulating members are disposed in abutting relationship to the members to be sealed. The beads and the members are then heated to an elevated temperature for a limited period of time. For example, when the members 12 and 22 are made from stainless steel, the members 12 and 22 and the insulating members are heated to a suitable temperature such as approximately 1250° F. for a limited period of time such as a period of approximately thirty (30) minutes to produce the seal between the members 12 and 22 and the insulating member 36.

The period of time for heating the members 12 and 22 and the insulating members 24, 26, 28, 30, 32, 34 and 36 to the elevated temperature to seal the members 12 and 22 and each of the insulating members is not especially critical. For example, the members 12 and 22 and the insulating member 36 may be maintained at the elevated temperature (such as approximately 1250° F. when the members 12 and 22 are made from stainless steel) for a period of time to approximately three (3) hours without affecting the properties of the insulating members or without affecting the hermetic seal between the insulating members and the members 12 and 22. This results in part from the fact that the insulating members are primarily polycrystalline.

Since the period of time for sealing the members 12 and 22 and the insulating members 24, 26, 28, 30, 32, 34 and 36 can be varied within wide limits, the members 12 and 22 and the insulating members can be heated to the elevated temperature such as approximately 1250° F. or 1550° F. a plurality of times, if necessary, to assure that a satisfactory hermetic seal is produced between the members and the material. For example, if tests reveal that a satisfactory hermetic seal has not been produced between the members 12 and 22 and the insulating members after they have been maintained for a first period of time at the elevated temperature, the members 12 and 22 and the material may be heated again to the elevated temperature and maintained at the elevated temperature for an additional period of time.

The percentages of the different oxides in the insulating members 24, 26, 28, 30, 32, 34 and 36 are shown in FIG. 3. The temperatures of smelting the members to form the beads and the temperatures of fusing the insulating members to the members 12 and 22 are also shown in FIG. 3.

When the insulating members 24, 26, 28, 30, 32, 34 and 36 have the composition in FIG. 3, their coefficient of thermal expansion throughout a range of temperatures to approximately 1550° F. changes at a rate which matches the changes in the coefficient of thermal expansion of stainless steel in the 300 series. For example, the coefficient of thermal expansion of the insulating member 24 may be approximately $4\times10^{-6}$ in/in° F. The insulating material 24 is able to withstand a heat soaking at an elevated temperature such as 1000° F. for an extended period such as forty eight (48) hours when it is sealed to a member made from a type 321 stainless steel or a member made from Inconel.

Because of the advantages discussed above, the insulating members of this invention may be sealed to members 12 and 22 of smaller size than in the prior art without losing the hermetic seal with the members. For example, the member 22 may be annular with a diameter of one eighth inch ($\frac{1}{8}$") and the insulating material members may be hermetically sealed to the member 22 and may be provided with a height of approximately one eighth inch ($\frac{1}{8}$").

The construction of, and the method of forming the members 38 and 40 are fully disclosed in co-pending application Ser. No. 836,659 filed by me on Sept. 26, 1977, now U.S. Pat. No. 4,352,951. The members 38 and 40 of this invention include a pair of fluxes having different melting temperatures. Preferably one of the fluxes has a melting temperature greater by several hundreds of degrees Fahrenheit, such as approximately 200° F. to 300° F. than the other flux. By way of illustration, one of the fluxes (Flux A) may have a melting temperature of approximately 800° F. and a composition for member 38 as follows:

| Material | Relative Percentage by Weight |
|---|---|
| Lead oxide (PbO) | 68.5 |
| Boric oxide ($B_2O_3$) | 10.5 |
| Silicon dioxide ($SiO_2$) | 21.0 |

The other flux (Flux B) may have a melting temperature of approximately 1000° F. and a composition as follows for the member 38:

-continued

| Material | Relative Percentage by Weight |
|---|---|
| Lead oxide (PbO) | 80.0 |
| Boric oxide ($B_2O_3$) | 20.0 |

Fluxes A and B tend to constitute eutectics which effectively lower the melting point of the boric oxide in the fluxes.

When fluxes A and B are provided as specified above, flux A may have a relative percentage by weight in the material of approximately fifteen percent (15%) to twenty-five percent (25%) and flux B may have a relative percentage by weight in the material of approximately forty percent (40%) to fifty-five percent (55%). A stuffing material having properties of becoming crystalline is also provided in the material in a percentage by weight of approximately twenty percent (20%) to forty-five percent (45%).

The crystal stuffing for the member 38 includes oxides of zinc and zirconium and silicon dioxide to provide for the formation of crystals in at least a portion of the material. The oxides of zinc and zirconium and the silicon dioxide may be included in such forms as zinc zirconium silicate, zirconium spinel and zirconium silicate. For example, the crystal stuffing may be formed from the following materials in the following percentages by weight:

| Material | Relative Parts by Weight |
|---|---|
| Lead antimonate ($Pb_3(SbO_4)_2)_2$ composed of lead, antimony and oxygen | 2 |
| Zinc zirconium silicate | 1 |
| Zirconium spinel | 1 |
| Ziconium silicate | 1 |

To form the material for the member 38 of this invention and to produce hermetic seals with such material, fluxes A and B are first smelted separately and quenched in water to frit the material. For example, flux A may be smelted for a period of approximately two (2) hours at a temperature of approximately 1500° F. and then quenched in water, and flux B may be smelted for a period of approximately one (1) hour at a temperature of approximately 1200° F. and then quenched in water. The crystal stuffing is smelted for a period of approximately three (3) hours at a temperature of approximately 1800° F. and is then quenched in water.

The fritted fluxes and the crystal stuffing are then mixed in the desired percentages and ground such as in a ball mill for a period of approximately three (3) to four (4) hours. The material is then heated to a temperature of approximately 1200° F. to 1300° F. for a period of approximately two (2) to three (3) hours. Preferably the material is stirred periodically such as every fifteen (15) minutes while it is being heated. The temperatures and times chosen for such heating operation are such as to partially combine the different compounds in the mixture. As a result, the material is predominantly amorphous but a portion has become crystalline. For example, approximately eighty percent (80%) of the material may be amorphous and approximately twenty percent (20%) may be crystalline. The material is then converted to a frit by quenching in water. The resultant material has a melting temperature of approximately 1100° F.

The material for the member 38 is then heated to a temperature slightly above its melting temperature for a period of time dependent upon the characteristics desired for the material. For example, the material may be heated to a temperature of approximately 1200° F. (100° F. above the melting temperature) for a period of approximately three (3) to four (4) hours. The material slowly changes from an amorphous glass to a ceramic as it is being heated.

The temperature and duration of the heating operation are chosen so that the coefficient of thermal expansion of the material is slightly greater than the coefficient of thermal expansion of the member, such as the ferrule 12 or the terminal pin 22, to be sealed. The temperature and duration of the heating operation are such that the material is approximately fifty percent (50%) amorphous and approximately fifty percent (50%) crystalline or slightly more crystalline than amorphous.

The fritted material is then pulverized and separated into different sizes. Beads are then formed by mixing particles of different sizes with a suitable material such as polyethylene glycol (marketed under the name "Carbowax") or an animal fat and pressing the particles together. For example, approximately forty percent (40%) of particles by weight with 150 mesh, approximately fifty percent (50%) of particles with 300 mesh and approximately ten percent (10%) of particles above 300 mesh may be mixed with polethylene glycol or an animal fat where the polyethylene glycol or the animal fat comprises one and one-half percent (1.5%) to three percent (3%) by weight in the mixture. The particles may then be pressed together to form the beads.

The beads are then disposed between the terminal pin 22 and the ferrule 12. The combination is then heated to a suitable temperature such as approximately 1225° F. for a suitable period of time such as a period to approximately thirty (30) minutes. The material then becomes fused to the terminal pin 22 and the ferrule 12. Since the combination is heated for only a relatively short period of time, the crystal structure of the material for the member 38 is not changed significantly during the heating operation.

The fusion of the member 38 to the ferrule 12 and the terminal pin 22 is facilitated by cooling the material rapidly in air. This causes the material in the member 38 to press against the ferrule 12 and the terminal pin 22 as it is rapidly cooled, particularly since the coefficient of thermal expansion of the material is slightly greater than that of the ferrule 12 and the terminal pin 22. By pressing against the ferrule 12 and the terminal pin 22 during such cooling, the material facilitates the production of a hermetic seal with the ferrule.

The hermetic seals between the member 38 and the ferrule 12 and between the member 38 and the terminal pin 22 are produced in various ways. For example, a thin polycrystalline layer is produced in the member 38 at the boundaries with the ferrule 12 and the terminal pin 22. For example, zinc silicate ($Zn_2SiO_4$) or a relatively complex compound of zinc, oxygen and silicon ($2ZnO.SiO_2$) having the same chemical composition as zinc silicate or a combination of both is formed at such boundary. These crystals tend to become formed in the presence of lead or antimony. These zinc compounds become crystallized in the form of Willemite crystals. Furthermore, crystals of zirconium silicate also become produced at such boundary.

The crystallization of the zirconium silicate occurs in the presence of lead. The crystallization of the zirconium silicate is facilitated by the inclusion of zinc zirconium silicate in the mixture since this compound tends to become dissolved at a lower temperature than zirconium silicate. Zinc zirconium silicate and zirconium silicate tend to exist as natural minerals and are preferably used in this form.

The Willemite crystals are of a different size and shape than the crystals of zirconium silicate. For example, the crystals of zirconium silicate tend to be smaller than the Willemite crystals. This causes nucleations of different sizes to be produced and facilitates the flexing and bending of the crystal layer adjacent the ferrule when subjected to thermal and mechanical shocks. In this way, the hermetic seal is maintained even when the material is subjected to severe thermal or mechanical shocks.

Zirconium spinel tends to increase the mechanical strength of the material. When introduced into the material, zirconium spinel is already in crystalline form so that it does not change as the material is heated and cooled as specified above. As a result, zirconium spinel acts as a filler in the material. Zirconium spinel tends to exist as a natural mineral and is preferably used in this form.

An oxygen valence bond is also produced between the member 38 and the ferrule 12 and between the member 38 and the terminal pin 22 to facilitate the formation of a hermetic seal between them. This oxygen valence bond results from a chemical bond between oxygen atoms in the material and atoms on the surface of the ferrule 12 and the terminal pin 22. In other words, the oxygen is shared by the layer on the surface of the ferrule 12 and the member 38 and the layer on the surface of the terminal pin 22 and the member. This oxygen valence bond is produced during the heating of the material and the ferrule to the relatively high temperatures.

The material constituting the member 38 also provides other advantages of some importance. For example, the material constituting the member 38 provides a high dielectric constant considerably greater than that of most other materials now in use. By way of illustration, the electrical insulation provided by the member 38 between the terminal pin 22 and the ferrule 12 is as high as $10^{18}$ ohms. This is important in such equipment as heart pacemakers which have to operate satisfactorily under all of the adverse sets of circumstances which a human body is capable of producing.

The material constituting the member 38 also has other advantages of some importance. For example, when the operation of hermetically sealing the terminal pin 22 and the ferrule 12 has been completed, tests are made to determine if a hermetic seal has actually been produced. If a hermetic seal has not been produced, the combination of the terminal pin, the ferrule and the member 38 may be fused at the temperature of approximately 1200° F. for an additional period to approximately thirty (30) minutes. Since the material constituting the member 38 is still somewhat amorphous, this additional fusing operation tends to facilitate the creation of the oxygen valence bond between the material and the ferrule and between the material and the terminal pin. It also tends to facilitate the creation of a polycrystalline structure in the material, particularly at the surface adjacent the ferrule. As a result, any failure to produce a hermetic seal tends to become corrected.

The members 38 and 40 may be respectively provided with the following compositions:

| | Relative Amounts in Mixture | |
|---|---|---|
| Material | Member 38 | Member 40 |
| Zirconium silicate | 6.8 | 6.8 |
| Zinc zirconium silicate | 3.4 | 3.4 |
| Boric oxide | 14.0 | 14.0 |
| Zirconium spinel | 3.4 | 3.4 |
| Red lead | 61.3 | 61.3 |
| Bismuth Trioxide | 6.8 | 6.8 |
| Quartz | 4.3 | 0 |
| Fusing temperature | 1200° F. | 1160° F. |

As will be seen, the fusing temperature of the member 38 is slightly below the fusing temperature of the member 36 and slightly above the melting temperature of the member 40. The terminal assembly may be accordingly disposed with the member 38 at the top of the assembly and the assembly may be heated to a temperature of 1200° F. to fuse the member 38 to the assembly. The terminal assembly may then be inverted and the material for the member 40 may then be applied. The terminal assembly may then be heated to a temperature of 1160° F. to fuse the member to the assembly.

In another embodiment of the member, a terminal pin 50 may be disposed within an annular ferrule 52 in spaced relationship to the ferrule. The terminal pin 50 may be made from a suitable material such as molybdenum and the ferrule 52 may be made from a suitable material such as steel having a higher coefficient of thermal expansion than the terminal pin.

Figure 2:
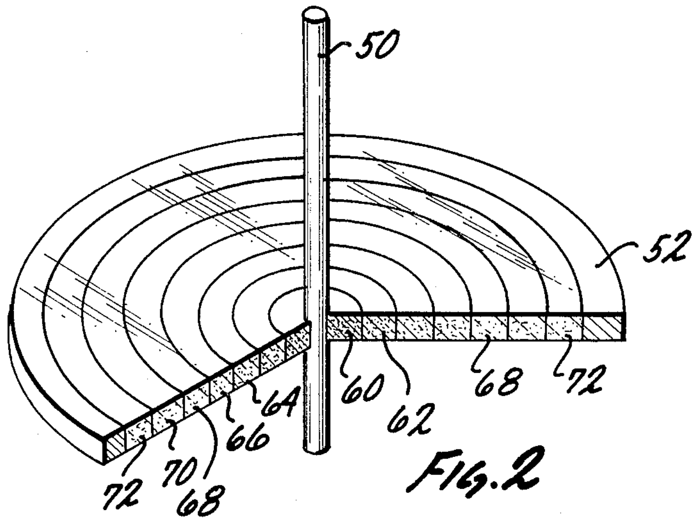
FIG. 2 is a perspective view, partially broken away, of a terminal assembly constituting a second embodiment of the invention.

The relationship between the terminal pin and the ferrule in the embodiment of FIG. 2 may be slightly unusual in the sense that the terminal pin generally has a higher coefficient of thermal expansion than the ferrule. The purpose of this is to have the terminal pin compress against the ferrule the insulating material between the terminal pin and the ferrule when the members expand with increased temperature.

Insulating members 60, 62, 64, 66, 68, 70 and 72 are disposed between the terminal pin 50 and the ferrule 52. The member 60 is adjacent the terminal pin 50 and the member 72 is adjacent the ferrule 52. The members 60, 62, 64, 66, 68, 70 and 72 have progressive increases in the coefficient of thermal expansion to provide a gradual transition between the coefficient of thermal expansion of the terminal pin 50 and the coefficient of thermal expansion of the ferrule 52.

The term "terminal pin" in the claims is intended to mean any type of electrically conductive member. The term "ferrule" is intended to mean any type of electrically conductive member spaced from the terminal pin.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination, a ferrule, a terminal pin disposed in spaced relationship to the ferrule, and a plurality of insulating members disposed in stacked relationship between the terminal pin and the ferrule and made from ceramic materials having partially amorphous and partially polycrystalline properties, each of the insulating members being fused to adjacent ones of the terminal pin, the ferrule and the other insulating members, each of the progressive insulating members in the stack having a progressive temperature of fusion in accordance with the positioning of the insulating member in the stack.

2. The combination set forth in claim 1 wherein each of the insulating members is relatively non-viscous.

3. The combination set forth in claim 1 wherein each of the progressive insulating members in the stack is formed from the same materials but in different proportions to provide for the progressive temperatures of fusion.

4. The combination set forth in claim 3 wherein the ferrule has an opening and the terminal pin extends through the opening in the ferrule to a position external to the ferrule and wherein an insulating material is fused to the ferrule and the terminal pin at the external position and has a high electrical resistivity.

5. In combination, a ferrule, a terminal pin disposed in spaced relationship to the ferrule, and a plurality of insulating members disposed between the terminal pin and the ferrule in a stacked relationship, each of the insulating members constituting a ceramic material having partially amorphous and partially polycrystalline properties, each of the insulating members being fused to adjacent ones of the terminal pin, the ferrule and the other insulating members, each of the insulating members in the stack having a higher temperature of fusion than the preceding members in the stack, the insulating members in the stack being progressively fused to the ferrule and the terminal pin and the other insulating members by the application of progressive temperatures to the terminal pin, the ferrule and the insulating members.

6. The combination set forth in claim 5 wherein each of the insulating members in the plurality is formed from the same materials as the other insulating members in the plurality but in different proportions relative to the other members in the plurality.

7. The combination set forth in claim 6 wherein each of the insulating members is hermetically sealed to the terminal pin and the ferrule.

8. In combination, a ferrule having at least one opening extending through the ferrule, a terminal pin extending through the opening in the ferrule in spaced relationship to the ferrule, and a plurality of insulating members disposed on the terminal pin in the opening in a stacked relationship, each of the insulating members being fused to at least a particular one of the terminal pin and the ferrule, and the other insulating members, each of the insulating members in the stack having a higher temperature of fusion than the preceding members in the stack, the insulating members in the stack being progressively fused to the ferrule and the terminal pin and the other insulating members by the application of progressive temperatures to the terminal pin, the ferrule and the insulating members, each of the insulating members in the plurality being formed from the same materials as the other insulating members in the plurality but in different proportions relative to the other members in the plurality, and an additional insulating member disposed on the ferrule and hermetically sealing the terminal pin and the ferrule at the external position.

9. The combination set forth in claim 8 where the ferrule is provided with a flange and the additional insulating member is hermetically sealed to the flange.

10. In combination, a ferrule, a terminal pin disposed in spaced relationship to the ferrule, and insulating means constituting a ceramic with partially amorphous and partially polycrystalline characteristics and disposed between the terminal pin and the ferrule and hermetically sealed to at least a particular one of the terminal pin and the ferrule, the insulating means having a progressively increased temperature of fusion to the ferrule and the terminal pin at progressive positions.

11. The combination set forth in claim 10 wherein the insulating means is made from the same combination of materials at the progressive positions but with different proportions of such materials at the progressive positions.

12. In combination set forth in claim 10 wherein the insulating means is primarily polycrystalline.

13. In combination, a ferrule having at least one opening extending through the ferrule, a terminal pin extending through the opening in spaced relationship to the ferrule, and insulating means disposed in the opening and hermetically sealed to at least a particular one of the terminal pin and the ferrule, the insulating means having a progressively increased temperature of fusion to the ferrule and the terminal pin with progressive positions along the opening, the insulating means being made from the same combination of materials at the progressive positions along the opening but with different proportions of such materials at the progressive positions, and an insulating member disposed on the ferrule in hermetically sealed relationship with the terminal pin and the ferrule at the external position.

14. The combination set forth in claim 13 wherein the ferrule is provided with a flange enveloping the terminal pin and the insulating member is hermetically sealed to the flange.

15. In combination, a ferrule, a terminal pin disposed in spaced relationship to the ferrule, and a plurality of insulating members disposed in stacked relationship with respect to the terminal pin and the ferrule and made from a ceramic material having partially amorphous and partially polycrystalline properties, each of the insulating members being fused to adjacent ones of the terminal pin, the ferrule and the other insulating members, each of the insulating members having a coefficient of thermal expansion which changes with temperature at a rate which matches the change in the coefficient of thermal expansion of at least one of the ferrule and the terminal pin with such changes in temperature.

16. The combination set forth in claim 15 wherein at least a particular one of the insulating members has properties to withstand large forces and at least another one of the insulating members has properties to withstand sudden changes in temperature.

17. The combination set forth in claim 15 wherein progressive layers of the insulating members have progressive increases in the temperature of fusion to the at least one of the ferrule and the terminal pin.

18. The combination set forth in claim 17 wherein each of the progressive layers of the insulating members in the stacked relationship is formed from the same materials but in different proportions to provide for the progressive increases in the temperature of fusion.

19. The combination set forth in claim 15 wherein each of the insulating members is relatively non-viscous.

20. The combination set forth in claim 15 wherein each of the insulating members has an electrical resistivity as high as $10^{10}$ ohms.

21. The combination set forth in claim 20 wherein each of the insulating members is formed from the following materials in the following percentages by weight:

| Material | Range of Percentages by Weight |
|---|---|
| Lead oxide (red lead) | 57-68 |
| Silicon dioxide | 23-32 |
| Soda ash (sodium carbonate) | 0.4-0.6 |
| Titanium dioxide | 3.2-3.9 |
| Zirconium oxide | 3.0-3.7 |
| Boric acid | 2.2-2.6 |

22. The combination set forth in claim 15 wherein the ferrule has an opening and the terminal pin extends through the opening and the ferrule is annular and has a flange and an additional insulating layer hermetically seals the terminal pin and the ferrule flange.

23. The combination set forth in claim 15 wherein each of the insulating members is primarily polycrystalline.

* * * * *